J. C. SWANSON.
SICKLE DRIVE FOR MOWING MACHINES AND HARVESTERS.
APPLICATION FILED JUNE 7, 1912.
1,082,659.
Patented Dec. 30, 1913.
2 SHEETS—SHEET 1.
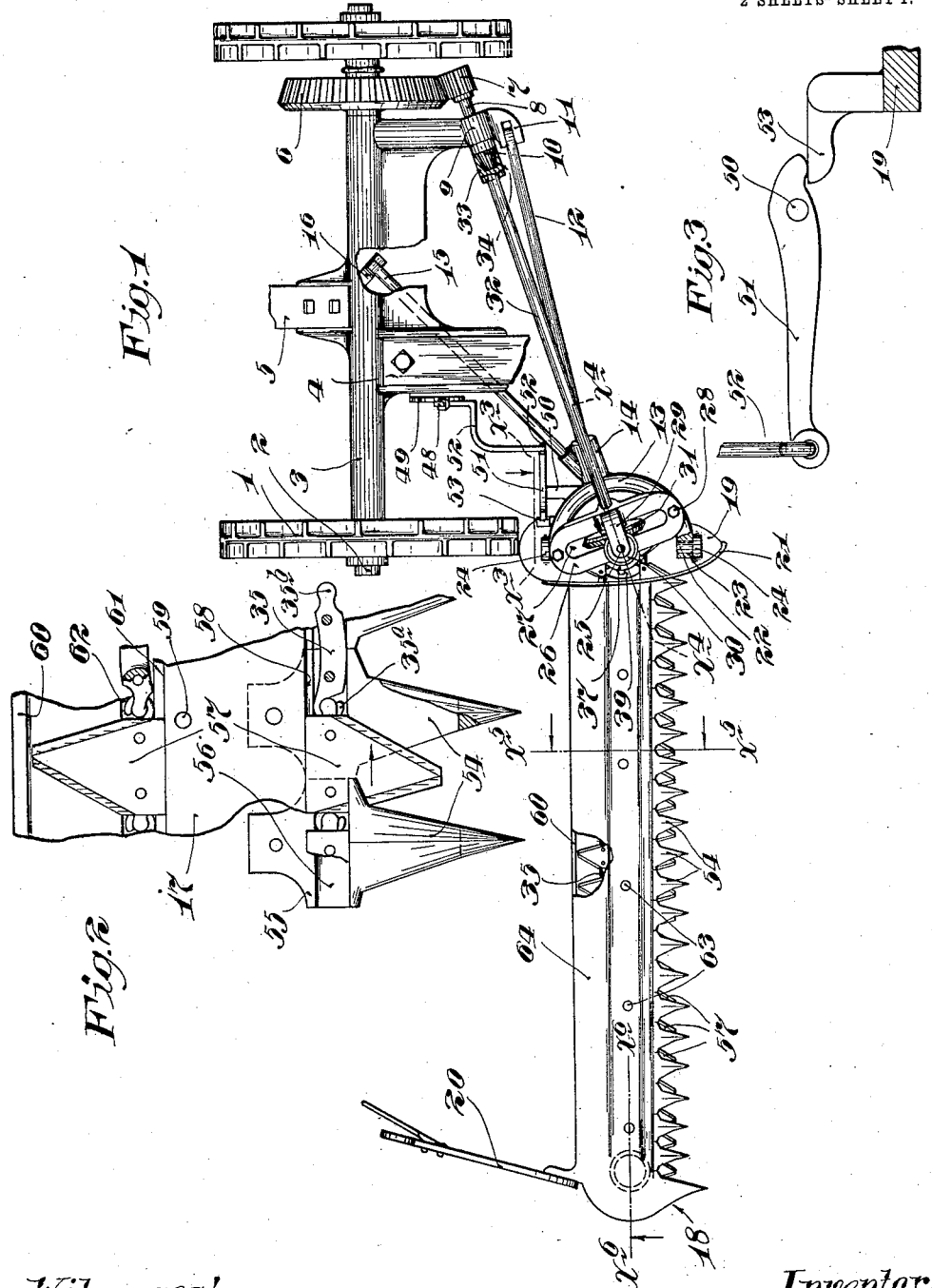

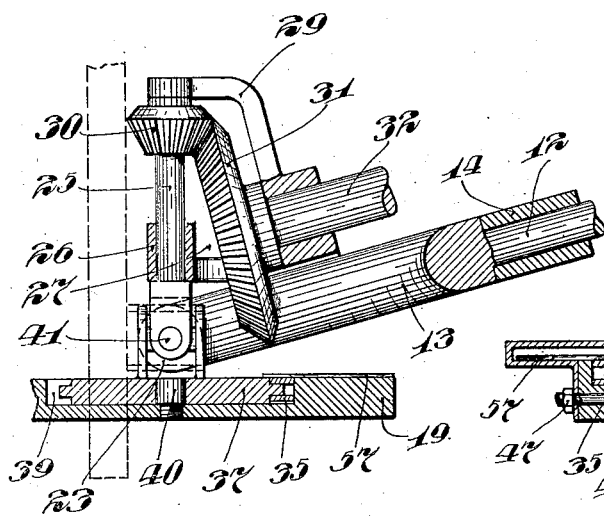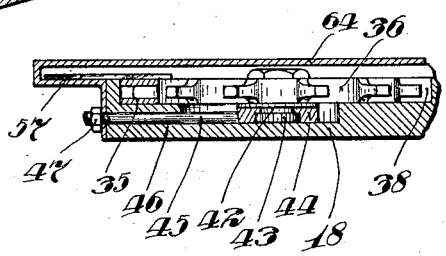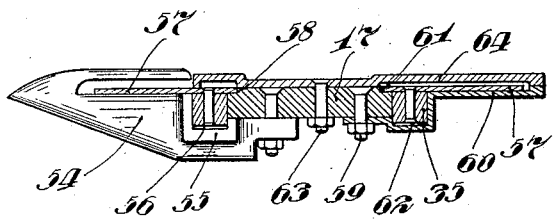

UNITED STATES PATENT OFFICE.

JOHN C. SWANSON, OF BUFFALO, MINNESOTA.

SICKLE-DRIVE FOR MOWING-MACHINES AND HARVESTERS.

1,082,659.   Specification of Letters Patent.   Patented Dec. 30, 1913.

Application filed June 7, 1912. Serial No. 702,212.

*To all whom it may concern:*

Be it known that I, JOHN C. SWANSON, a citizen of the United States, residing at Buffalo, in the county of Wright and State of Minnesota, have invented certain new and useful Improvements in Sickle-Drives for Mowing-Machines and Harvesters; and I do hereby declare the following to be a full, clear, and exact description of the invention, such as will enable others skilled in the art to which it appertains to make and use the same.

My invention relates to that class of mowing machines, harvesters, and the like, wherein the cutting mechanism comprises sickle knives, flexibly connected by means of the links of an endless chain driven in a continuous direction, and has for its object to improve the same in the several particulars, hereinafter described and defined in the claims.

The invention is illustrated in the accompanying drawings, wherein like characters indicate like parts throughout the several views.

Referring to the drawings, Figure 1 is a plan view of a mowing machine having embodied therein my invention; Fig. 2 is a detail view in plan of a portion of the cutting apparatus, on an enlarged scale; Fig. 3 is a detail view of a portion of the lifting device for the cutting apparatus, some parts being sectioned on the line $x^3$ $x^3$ of Fig. 1, on an enlarged scale; Fig. 4 is a vertical section taken on the line $x^4$ $x^4$ of Fig. 1, on an enlarged scale; Fig. 5 is a transverse section, taken on the line $x^5$ $x^5$ of Fig. 1, on an enlarged scale; and Fig. 6 is a longitudinal vertical section taken on the line $x^6$ $x^6$ of Fig. 1, on an enlarged scale.

For the purpose of showing my invention applied in working position, a portion of a mowing machine has been illustrated in the drawings. Of the parts of the mowing machine illustrated, which may be of the standard or any desired construction, the numeral 1 indicates the wheels journaled on an axle 2, and the numeral 3 indicates the frame mounted on the axle 2 and having secured thereto the customary tongue 4 and seat support 5.

Keyed or otherwise secured to the axle 2, is a large bevel gear 6 that meshes with a pinion 7 rigidly secured at one end of a short shaft 8. This shaft 8 is journaled in a comparatively long bearing 9 integrally formed with the frame 3. To the other end of the shaft 8 is rigidly secured, a bevel pinion 10. On the forward portion of the bearing 9 is integrally formed a bifurcated lug 11 to the prongs of which is pivotally connected, at its rear end, a long bar 12 for connecting the cutting mechanism to the frame 3. This bar 12 extends forwardly and laterally toward the grain side of the swarth and terminates at its forward end in a bifurcated head 13. On the forward end portion of the bar 12, adjacent to the bifurcated head 13, is loosely journaled a sleeve 14 to which is rigidly secured the forward end of a rearwardly diverging brace rod 15. The rear end of this brace rod 15 is pivotally attached to a bearing 16 rigidly secured to the under side of the frame 3 adjacent to the seat support 5. By reference to Fig. 1, it will be noted that the pinion 10 is vertically and horizontally alined with the rear pivotal connections of the bar 12 and rod 16, the purpose of which will presently appear.

The cutter or sickle bar 17 is in the form of a flat horizontally extended bar of rolled steel, or other suitable material, having rigidly secured to its ends, an outer drag shoe 18 and an inner drag shoe 19. The customary grass or grain dividing board 20 is secured to the outer drag shoe 18 and the customary guard flange 21 is secured to and projects above the inner drag shoe 19. For securing the sickle bar 17 to the bifurcated head 13, for swinging movement, transversely of the direction of travel of the machine, is provided a pair of alined horizontally extended trunnions 22 journaled in eyes 23 formed in the ends of the prongs of the bifurcated head 3. These trunnions 22 are integrally formed on bearing lugs 24 also integrally formed on the upper face of the inner drag shoe 19 and project upward therefrom.

A short vertically extended shaft 25 is journaled at its lower end in the front section of a yoke-like bridge bar 26 having formed in its intermediate portion, a longitudinally extended slot 27. Machine screws 28 detachably secure the ends of the bridge bar 26 to the prongs of the bifurcated head 13. Integrally formed with the rear section of the bridge bar 26 is an upwardly and forwardly extended bearing arm 29 in which the upper end of the shaft 25 is journaled. Keyed, or otherwise secured, to the shaft 25 just below the bearing arm 29 is a bevel pinion 30 that meshes with a large bevel gear 31 working within the slot 27 of the bridge bar 26. This bevel gear 31 is rigidly secured to the forward end of a comparatively long driving shaft 32 journaled, at its forward end, in the rear section of the bridge bar 26 at the junction of the bearing arm 29 therewith. At its rear end, the shaft 32 terminates in a recessed coupling head 33 adapted to telescopically receive the pinion 10. This coupling head 33 is provided with internal teeth 34 that loosely mesh with the teeth of the bevel pinion 10. As is evident, the bevel pinion 10 and coupling head 33 form a flexible connection between the shafts 8 and 32.

A sprocket chain 35 runs over a pair of horizontally alined sprocket wheels 36 and 37, mounted in recesses 38 and 39 formed, respectively, in the upper faces of the drag shoes 18 and 19. The sprocket wheel 37 is loosely journaled on a short vertcially extended stud 40, axially alined with the shaft 25 and having a reduced lower end secured to the drag shoe 19 at the bottom of the recess 39 by screw threaded engagement. (See Fig. 4.) The shaft 25 is connected, at its lower end, to the upper face of the sprocket wheel 37 by a universal joint 41. It is important to note that the universal joint is alined with the connections between the bifurcated head 13 and sickle bar 17 in order to permit the swinging movement of the cutting mechanism with respect to the machine proper. The sprocket wheel 36 is loosely journaled on a short stud 42 terminating at its lower end in a head 43, which in turn, is journaled in a bearing block 44 slidably mounted on the bottom of the recess 38. A horizontally extended anchoring stem 45 is rigidly secured to the bearing block 44 and works through a perforation 46 formed in the drag shoe 18. To the outer projecting end of the stem 45 is applied, by screw threaded engagement, an adjusting nut 47 which bears against the drag shoe 18 as a base of resistance. By the adjustment of the nut 47, the sprocket wheel 36 may be moved toward or from the sprocket wheel 37 for the purpose of adjusting the sprocket chain 35.

For raising the cutting mechanism, I secure to one side of the support for the tongue 4 a hand lever 48 and coöperating lock segment 49. And to a rearwardly projecting bearing 50, integrally formed on the bifurcated head 13 is intermediately pivoted a horizontally extended lever 51. The long end of this lever 51 is connected to the hand lever 48 by means of a link 52 the short or free end of the lever 51 overlies and rests upon a lug 53 integrally formed on the opposite side of the drag shoe 19 from the cutting mechanism attached thereto. By moving the hand lever 48 in a proper direction, the short end of the lever 51 will force the lug 53 downward, thereby lifting the outer or free end of the sickle bar 17.

Owing to the novel arrangement of the connections between the cutting mechanism and the frame 3, the drag shoe 19 is free to rise and fall as the same travels over irregularities in the field. It is also evident that the flexible connection between the shafts 8 and 32 will prevent the driving connections from binding during such movements of the drag shoe 19 and also during undue strains on the machine. The loosely journaled sleeve 14 on the rod 12, will also permit the drag shoe 19 and connected parts to oscillate on an axis extending transversely of the direction of travel of the machine.

The sides of each guard finger 54, adjacent to the front edge of the sickle bar 17, are expanded to form a pair of oppositely projecting shoulders 55. These shoulders closely engage the adjacent guard fingers, as best shown in Fig. 2. Cut transversely through the guard fingers 54, at their shoulders 55, is a continuous channel 56 extending parallel with the sickle bar 17 and connecting the recesses 38 and 39 of the drag shoes 18 and 19, respectively. By reference to Fig. 5, it will be noted that a portion of the rear wall of the channel 56 is formed by the front vertical face of the sickle bar 17. The chain 35 is mounted to run through the channel 56 and is held thereby for straight line movement. As shown in Fig. 2, it will be noted that each link of the chain 35 is in the form of a segment with its outwardly curved intermediate portion engaging the front wall of the channel 56 and with its inwardly curved ends engaging the rear wall of said channel. By this construction of the links of the chain 35, the friction between the chain and channel is greatly reduced. One end of each link 35 terminates a hook 35ª that has detachable interlocking engagement with a coupling pin 35ᵇ of the adjacent link.

Sickle knives 57 are rigidly secured, one to the upper surface of each of the links of the chain 35, by means of rivets or other suitable means. The front portions of the sickle knives 57 rest upon and slide over the upper faces of the guard fingers 54 in the customary manner. At their rear ends, these knives extend slightly beyond the sprocket chain 35 and slide laterally over stop shoulders 58 formed in the front upper edge of the sickle bar 17. The sickle knives 57 support the chain 35 above the bottom of the channel 56, as shown in Fig. 5 so that the sickle knives 57 always rest flat on the guard fingers 54. Secured to the rear lower edge of the sickle bar 17, by means of nutted bolts 59, is a rearwardly and horizontally extended guide plate 60, over which and a stop shoulder 61 formed in the rear upper edge of the sickle bar 17, the sickle knives 57 slide during their return movements. In the guide plate 60, is pressed a channel 62, which, in connection with the rear vertical face of the sickle bar 17, guides the chain 35 in its return movement.

On top of the sickle bar 17, is rigidly secured, by nutted bolts 63, a cover 64 which completely covers the sickle bar 17 and the sickle knives 57, except where said sickle knives pass through the guard fingers 54. Where the cover 64 passes over the sickle knives 57, the same is pressed upward to permit free movement of said knives. At its rear edge, the cover 64 closely engages the guide plate 60 and at its forward edge, it is bent laterally downward into engagement with the underlying sickle knives 57 and holds the same in flat engagement with the guard fingers 54. As best shown in Fig. 1, the cutting edges of the sickle knives 57 are inclined to secure the proper shearing action with respect to the guard fingers 54 and the opposite edges of said knives are formed comparatively straight to add strength thereto.

What I claim is:

1. In a machine of the kind described, the combination with a sickle bar and cutting mechanism mounted thereon, of a connecting bar pivotally attached at its rear end to the frame of said machine and having at its forward end a bifurcated head having its prongs pivotally attached to said sickle bar, a brace rod attached to the forward end of said connecting bar by a loose joint, rearwardly diverging therefrom and pivotally attached at its rear end to the frame of said machine, and driving connections from the traction wheel of said machine to said cutting mechanism including flexible joints located on lines intersecting the pivotal connection between said bar and rod and the frame of said machine, and the pivotal connections between the prongs of the bifurcated head and the sickle bar, said two flexible joints extending substantially at right angles one to the other, substantially as described.

2. In a machine of the kind described, the combination with a sickle bar and cutting mechanism mounted thereon, of a connecting bar pivotally attached at its rear end to the frame of said machine and terminating at its forward end in a bifurcated head having its prongs pivotally attached to said sickle bar, a brace rod connected to the forward end of said connecting bar by a loose joint, rearwardly diverging therefrom and pivotally attached at its rear end to the frame of said machine, a driving shaft journaled at one end in a bearing on said machine frame and having its other end journaled in a bearing on said bifurcated head, driving connections between the one end of said shaft and the traction wheel of the machine, driving connections between the other end of said shaft and the cutting mechanism including a universal joint located on a line intersecting the pivotal connections between said bifurcated head and sickle bar, and a flexible joint in said driving shaft located on a line intersecting the pivotal connections between said bar and rod and the frame of said machine, said two flexible joints extending substantially at right angles one to the other, substantially as described.

3. In a machine of the kind described, the combination with a sickle bar and cutting mechanism mounted thereon, of a connecting bar pivotally attached at its rear end to the frame of said machine and having at its forward end a head pivotally attached to the sickle bar, a brace rod connected to the forward end of said connecting bar by a loose joint, rearwardly diverging therefrom and pivotally attached at its rear end to the frame of said machine, a gear-equipped driving shaft journaled at one end on said machine frame and having its other end journaled on said head, driving connections between one end of said shaft and the traction wheel of the machine, and a vertically extended shaft journaled on said head and having at its upper end a pinion meshing with the gear of said driving shaft and having its lower end connected to said cutting mechanism by a flexible joint, substantially as described.

4. In a machine of the kind described, the combination with a sickle bar and cutting mechanism mounted thereon, of a connecting bar pivotally attached, at its rear end, to the frame of said machine and terminating, at its forward end, in a bifurcated head having its prongs pivotally attached to said sickle bar, a brace rod connected to the forward end of said bar by a loose joint, rearwardly diverging therefrom and pivotally attached, at its rear end, to the frame of said machine, a bridge bar secured to the prongs of said head, a gear-equipped driving shaft journaled, at one end, on said machine and having its other end journaled on said bridge bar, driving connections between one end of said shaft and the traction wheel of the machine, a vertically extended shaft journaled on said bridge bar and having, at its upper end, a pinion meshing with the gear of said driving shaft and having its lower end connected to said cutting mechanism by a flexible joint, and a flexible joint in said driving shaft located in a line intersecting the pivotal connections between said bar and rod and the frame of said machine, substantially as described.

In testimony whereof I affix my signature in presence of two witnesses.

JOHN C. SWANSON.

Witnesses:
R. E. NORD,
A. J. GORMAN.

Copies of this patent may be obtained for five cents each, by addressing the "Commissioner of Patents, Washington, D. C."